UNITED STATES PATENT OFFICE.

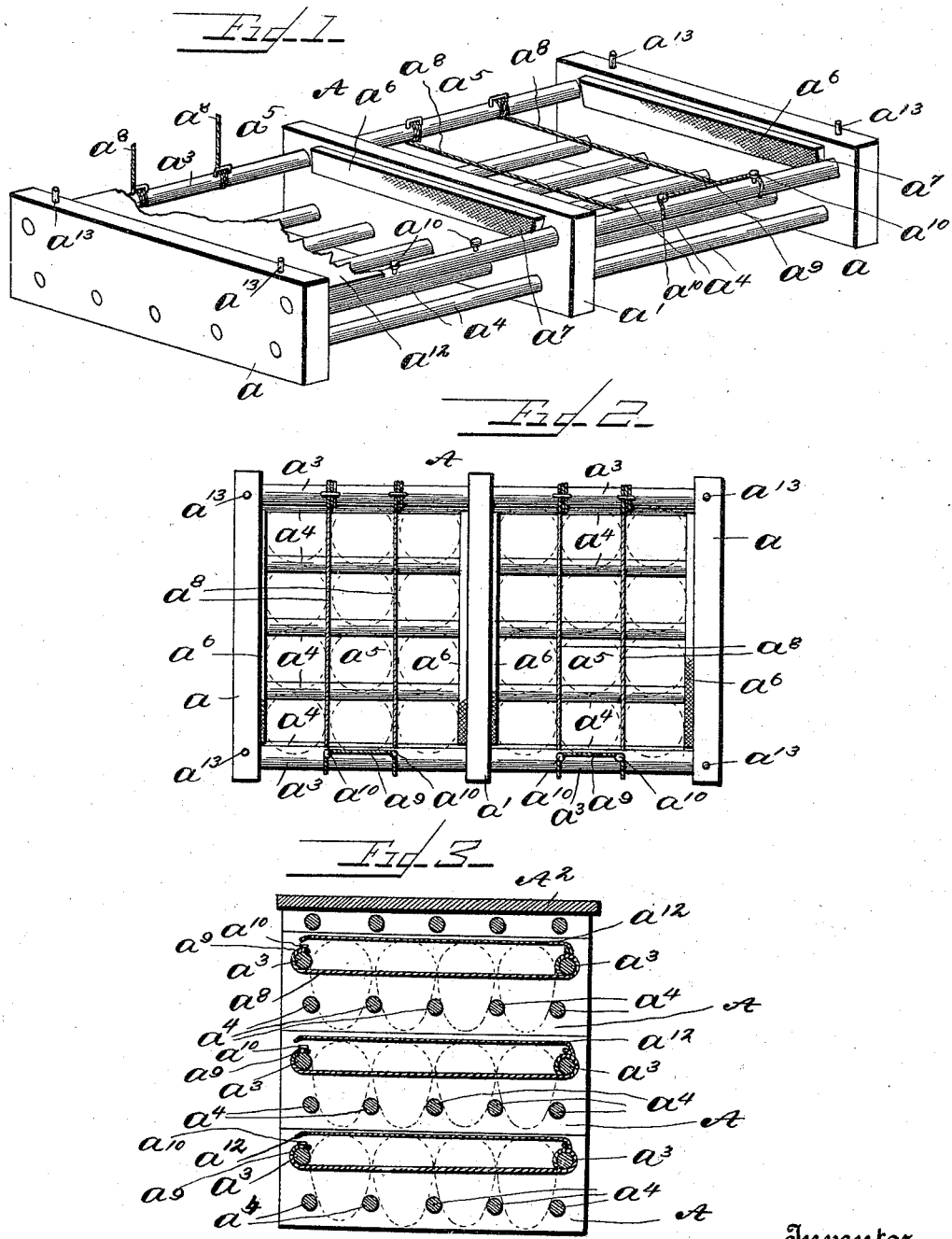

JOHN GÜTHERMANN, OF PHILADELPHIA, PENNSYLVANIA.

EGG AND FRUIT CRATE.

SPECIFICATION forming part of Letters Patent No. 540,246, dated June 4, 1895.

Application filed January 24, 1895. Serial No. 536,079. (No model.)

*To all whom it may concern:*

Be it known that I, JOHN GÜTHERMANN, a citizen of the United States, residing at Philadelphia, in the county of Philadelphia and State of Pennsylvania, have invented certain new and useful Improvements in Egg and Fruit Crates; and I do hereby declare the following to be a full, clear, and exact description of the invention, such as will enable others skilled in the art to which it appertains to make and use the same.

My invention relates to devices for preserving eggs and fruit in a prime condition and to prevent them from being broken or bruised when the crate is handled.

The device is particularly designed for use in cold storage warehouses but can be used for transportation purposes when desired.

The object and nature of the invention will more fully appear from the subjoined description, and the novelty will be fully pointed out in the claims, reference being had to the accompanying drawings, in which—

Figure 1 represents a perspective of a crate; Fig. 2, a top plan; Fig. 3, a transverse section showing a number of crates ready for shipment, and Fig. 4 a similar section of one crate.

The crate A is formed of the end pieces $a$ and $a'$ and the longitudinal strips $a^3$ and $a^4$. The strips $a^3$ form the side bars, and strips $a^4$ the bottom of the crate. The strips $a^4$ are placed sufficiently far apart to allow an egg to rest between two of them without falling through and a sufficient distance from the bottom of the end pieces for the eggs not to touch an object below the lower edge of said end pieces when the crates are separated and allowed to rest upon flat surfaces.

The crates may be made as long as desired and as many partitions $a^5$ used as may be required, the object of the partitions being to separate the eggs into short series so that when the crate is moved there will be practically no movement of the eggs which would not be the case if the eggs were arranged in a long series. To prevent contact of the eggs with the end pieces and partitions, a strip of felt $a^6$ or other suitable material is placed near the top of said partitions and preferably have a face $a^7$ inclined inward and downward so that the eggs will be partly under the strip.

The eggs are held from movement in one direction by the bottom strips and in the other by strings $a^8$ passed crosswise between the eggs at right angles to the bottom strips and drawn tight so that the two outer rows of eggs will be forced against the inclined face $a^7$ of strip $a^6$. The preferred manner of arranging the string is in the form of a loop permanently secured by its free ends to one of the strips $a^3$ and its loop end $a^9$, when the eggs are in place, sprung over the pins $a^{10}$ on the other strip $a^3$. The strips $a^3$ are about the same distance below the top of the end pieces as the bottom strips are above the bottom pieces so that if the crate be inverted from the position shown in Fig. 1, the eggs will not come in contact with any object upon which the crate may be placed, nor will the eggs fall out as the inclined strips and the strings will hold the eggs in place when the position of the crate is reversed.

It often happens in packing the eggs that the packer breaks some of them. To prevent the contents of the shell from passing to the next crate below a sheet of parchment paper $a^{12}$ is attached by one end to a strip $a^3$ and spread over the top of the crate to catch the drippings. The sheet can then be drawn through the space between strip $a^3$ and the bottom of the crate above it and washed and returned to its place over the eggs without the necessity of removing the upper crates. By this arrangement all decaying matter can be readily removed from the crates, thereby preserving the rest of the contents of the crates from the foul odors of decaying matter which otherwise would remain in the crates.

The crates may be packed for shipment in any of the well known ways. The preferred way is to place pins $a^{13}$ upon the upper side of the end pieces and form corresponding openings in the under side into which the pins of the next lower crate will enter. The top of the pile is capped with the lid $A^2$ and the whole secured together by strips in the well known manner of securing crates together.

What I claim as new is—

1. In a crate, the combination of the end pieces having the felt strips, the side strips below the top of the end pieces; the bottom strips above the bottom of the end pieces; and the strings secured to the side strips and stretched crosswise of the bottom strips and over the contents of the crate.

2. In a crate, the combination of the end pieces having the felt strips; the side strips below the top of the end pieces; the bottom strips above the bottom of the end pieces; and the string loop secured by its free ends to one strip $a^3$ and by its loop end to pins on the other strip $a^3$.

3. In a crate composed of series of sections set one upon another and secured together, the combination of the side strips, and sheets of flexible parchment or other suitable material secured at one edge to one of said side strips and adapted to be spread over the contents of each section of the crate and to be withdrawn therefrom for cleansing without disassociating the sections of the crate.

In testimony whereof I affix my signature in presence of two witnesses.

JOHN GÜTHERMANN.

Witnesses:
WM. E. HALLECK,
G. A. TAUBERSCHMIDT.